United States Patent
Emonin

(10) Patent No.: US 10,960,241 B2
(45) Date of Patent: Mar. 30, 2021

(54) FIXING BUCKLE AND HARNESS COMPRISING ONE SUCH BUCKLE

(71) Applicant: ZEDEL, Crolles (FR)

(72) Inventor: Simon Emonin, Grenoble (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 16/037,235

(22) Filed: Jul. 17, 2018

(65) Prior Publication Data
US 2019/0022436 A1    Jan. 24, 2019

(30) Foreign Application Priority Data
Jul. 18, 2017    (FR) ................................. 17 56809

(51) Int. Cl.
| | |
|---|---|
| *A62B 35/00* | (2006.01) |
| *A44B 11/00* | (2006.01) |
| *A44B 11/26* | (2006.01) |
| *A44B 11/25* | (2006.01) |
| *A44B 11/28* | (2006.01) |

(52) U.S. Cl.
CPC ........ *A62B 35/0025* (2013.01); *A44B 11/005* (2013.01); *A44B 11/2584* (2013.01); *A44B 11/26* (2013.01); *A44B 11/263* (2013.01); *A44B 11/28* (2013.01); *Y10T 24/4534* (2015.01); *Y10T 24/45366* (2015.01)

(58) Field of Classification Search
CPC ........... Y10T 24/45723; Y10T 24/4534; Y10T 24/45361; Y10T 24/45366; Y10T 24/45319; F16B 45/02
See application file for complete search history.

(56) References Cited

U.S. PATENT DOCUMENTS

| | | | | |
|---|---|---|---|---|
| 644,699 | A | * 3/1900 | Woordford | B66C 1/36 294/82.2 |
| 797,941 | A | * 8/1905 | Corbett | F16B 45/02 24/599.4 |
| 1,209,615 | A | * 12/1916 | Obsboum | A44C 5/2014 24/598.3 |
| 1,677,592 | A | * 7/1928 | Lloyd | F16B 45/02 24/600.9 |
| 5,480,202 | A | * 1/1996 | Gloden | B66C 1/36 24/599.8 |
| 2005/0011058 | A1 | * 1/2005 | Simond | B66C 1/36 24/599.1 |

(Continued)

*Primary Examiner* — Robert Sandy
*Assistant Examiner* — Michael S Lee
(74) *Attorney, Agent, or Firm* — Oliff PLC

(57) ABSTRACT

The fixing buckle includes first and second securing parts provided with coupling elements one of which defines a hook. A closure system is configured to define a first position preventing extraction of the first coupling elements from the second coupling elements and a second position allowing insertion and extraction of the first coupling elements. The closure system includes first and second closure plates each having a first position obstructing the hook and a second position configured to remove the first coupling elements. The first position of the first closure plate is configured to prevent movement of the second closure plate from its first position to its second position. The second closure plate separates the first coupling elements and the first closure plate along an extraction channel defined by the hook.

16 Claims, 7 Drawing Sheets

(56) References Cited

U.S. PATENT DOCUMENTS

2008/0022497 A1* 1/2008 Thompson .............. F16B 45/02
  24/598.1
2013/0036579 A1* 2/2013 Christianson .......... F16B 45/02
  24/600.1

* cited by examiner

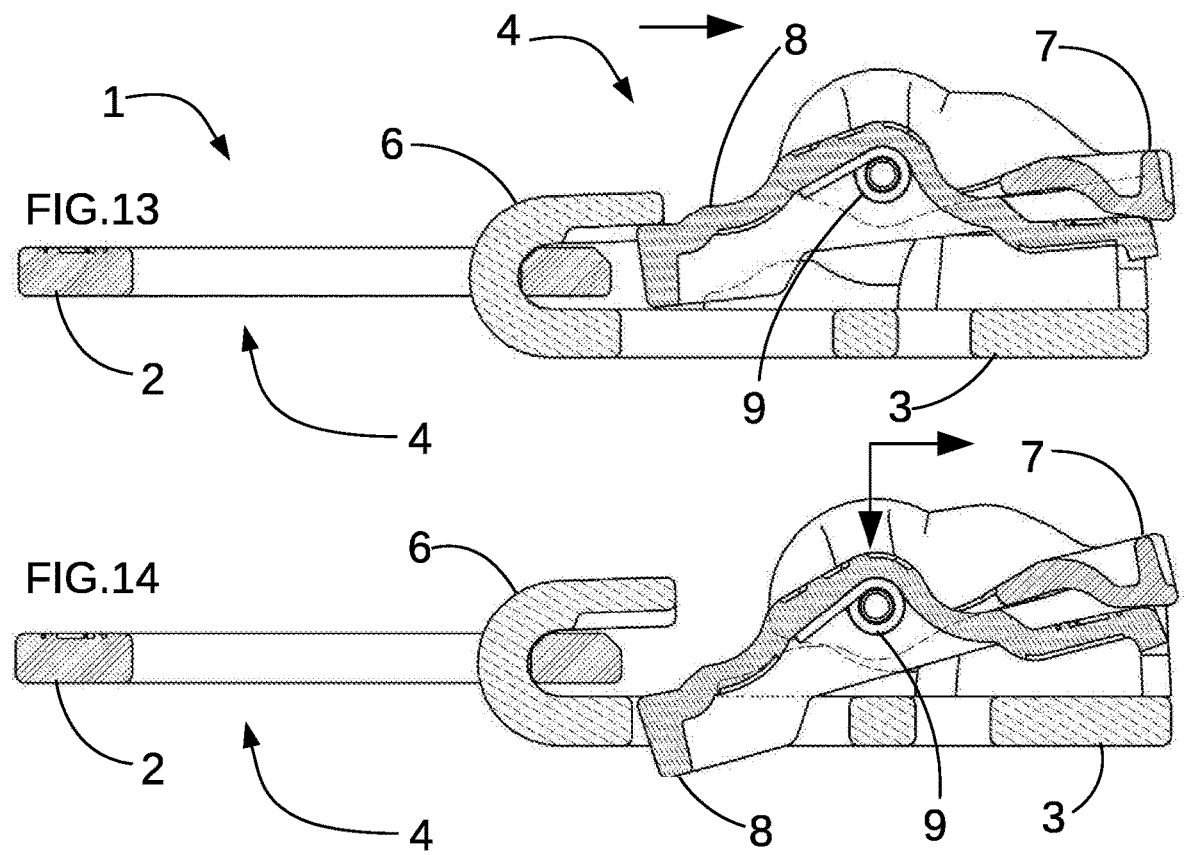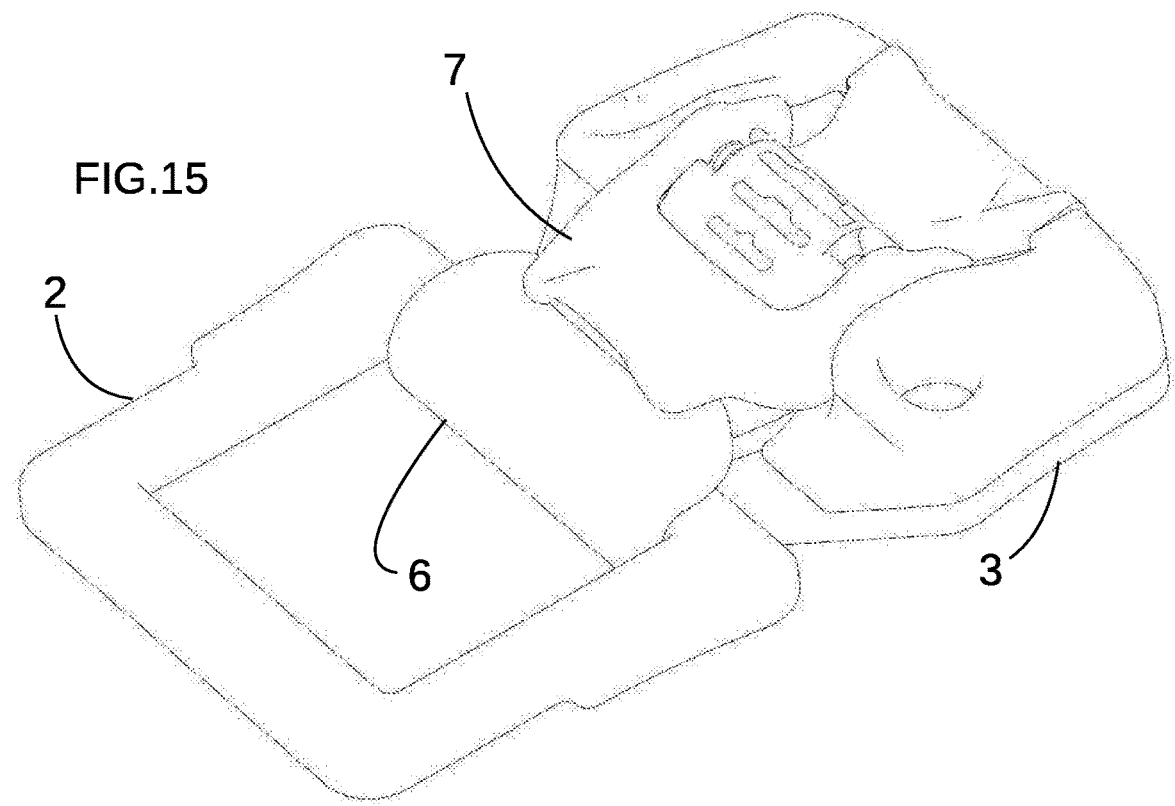

FIXING BUCKLE AND HARNESS COMPRISING ONE SUCH BUCKLE

FIELD OF THE INVENTION

The invention relates to a fixing buckle and to a harness which comprises one such buckle.

STATE OF THE ART

In conventional manner, a rope access technician uses his harness in order to move and work at height. As the rope access technician spends most of his working day strapped in his harness, it is necessary to have a harness that is adjustable and comfortable. The harness is used every day and it can be put on and taken off several times a day. This is why the harness has a particular configuration so that fitting and removal thereof are easy to perform.

The harness is in fact configured to be fitted and removed easily by a user throughout the year and in different fields. In conventional manner, the harness is provided with quick release fixing buckles which are configured to open and close easily and quickly. These quick release buckles are generally used to close a pair of thigh straps and/or a belt.

However, the use of a quick release buckle which is configured for ease of opening with a view to fitting the harness or removing the latter can result in an increase of the probability of the buckle opening in undesired manner.

A trade-off has to be found between ease of use of the quick release buckle and the difficulty of preventing undesired opening of the fixing buckle.

It is known to use a quick release buckle which comprises a ring collaborating with a hook. The hook defines an insertion and extraction channel of the ring. The insertion and extraction channel is obstructed by a closure plate or two distinct closure plates which are actuated separately by means of two different buttons. To open the fixing buckle, it is necessary to press on both of the buttons which means having to use at least two fingers. Actuation of the buttons moves the closure plates to free the extraction channel.

Increasing the number of independent closure plates increases the safety aspect by making the user perform an increasingly complex action. Increasing the number of buttons and the location of the buttons makes it possible to reduce the frequency of occurrence of undesired openings. However, this enhanced safety results in use of the buckle being more difficult which makes it less and less advantageous, in particular if the buckle cannot be actuated if the user is wearing gloves.

It is known to use a quick release buckle which comprises a ring collaborating with a hook defining an insertion and extraction channel of the ring. The insertion and extraction channel is obstructed by a single closure plate actuated by a button for ease of use of the closure plate. The channel does however present a complex shape which imposes a particular path on the ring to insert it or remove it from the hook. The user has to be endowed with a certain dexterity to move the ring to fit or remove his harness. The complexity of the running path in the channel enables a possible undesired opening of the closure plate to be circumvented.

OBJECT OF THE INVENTION

One object of the invention consists in providing a fixing buckle which is easy to use and which presents reduced probabilities of undesired opening.

The fixing buckle is remarkable in that it comprises:
a first securing part provided with a first coupling element,
a second securing part provided with a second coupling element defining a hook, the hook being configured to collaborate with the first coupling element so that the first coupling element is attached to the second coupling element in removable manner,
a closure system configured to define a first position preventing extraction of the first coupling element from the second coupling element and a second position allowing insertion and extraction of the first coupling element, the closure system comprising:
  a first closure plate presenting a first position configured to at least partially obstruct the hook and prevent extraction of the first coupling element from the second coupling element and a second position configured to insert and extract the first coupling element,
  a second closure plate presenting a first position preventing extraction of the first coupling element from the second coupling element by at least partially obstructing the hook, and a second position for insertion and extraction of the first coupling element.
The fixing buckle is also remarkable in that:
the first position of the first closure plate is configured to prevent movement of the second closure plate from its first position to its second position,
the second closure plate separates the first coupling element and the first closure plate along an extraction channel defined by the hook.

In one development, when the first closure plate is in the first position, the first closure plate at least partially masks the second closure plate so as to prevent the second closure plate from moving from the first position to the second position.

In advantageous manner, movement of the first closure plate from the first position to the second position takes place in a first direction of movement and movement of the second closure plate from the first position to the second position takes place in a second direction different from the first direction.

In another development, the first direction and the second direction define an angle at least equal to 45°. Advantageously, the angle is at least equal to 90°, preferably at least equal to 120°.

In an advantageous embodiment, the first closure plate and the second closure plate are fitted movable in rotation, rotation of the first closure plate from the first position to the second position is performed in a first direction and rotation of the second closure plate from the first position to the second position is performed in a second direction opposite from the first direction.

In preferential manner, the first closure plate is fitted movable in translation from the first position to the second position and movable in rotation to actuate the second closure plate from the first position to the second position, the first closure plate being in the second position.

It is also advantageous to provide for the first closure plate to press on the hook in the first position.

In preferential manner, the first closure plate is configured to form a protective cover which masks the second closure plate to prevent actuation of the second closure plate from its first position to its second position.

It is advantageous to provide for the first closure plate to be configured to prevent actuation of the second closure plate when the first closure plate is in its first position.

In a particular embodiment, the first closure plate is fitted movable with respect to a support point fixed to the second closure plate. The first closure plate comprises a blocking part. The first closure plate is configured so that, when the first closure plate is in the first position, the blocking part prevents movement of the second closure plate from its first position to the second position, and that when the first closure plate is in the second position, the blocking part enables movement of the second closure plate from its first position to the second position.

Advantageously, the first closure plate is mounted rotationally with respect to the second closure plate and the blocking part is mounted rotationally with respect to the second closure plate.

It is further object of the invention to provide a harness which comprises a fixing buckle according to one of the foregoing embodiments. The first securing part is provided with a first means for attachment to a first strap and the second securing part is provided with a second means for attachment to a second strap.

It is a further object of the invention to provide a method for opening a fixing buckle that is easy to use and that reduces the risks of undesired opening.

The method for opening the fixing buckle is remarkable in that it comprises:

Providing a first securing part provided with a first coupling element and a second securing part provided with a second coupling element defining a hook, the hook being configured to collaborate with the first coupling element so that the first coupling element is fixed to the second coupling element in removable manner, the hook being obstructed by a first closure plate and a second closure plate, Moving the first closure plate from a first position preventing extraction of the first coupling element from the second coupling element up to a second position enabling insertion and extraction of the first coupling element, the first position of the first closure plate preventing movement of the second closure plate from the first position to the second position, Moving the second closure plate from the first position preventing extraction of the first coupling element from the second coupling element up to the second position enabling insertion and extraction of the first coupling element.

BRIEF DESCRIPTION OF THE DRAWINGS

Other advantages and features will become more clearly apparent from the following description of particular embodiments of the invention given for non-restrictive example purposes only and represented in the appended drawings, in which:

FIGS. 9 to 14 represent schematic cross-sectional views of different steps of opening of a fixing buckle according to a second embodiment, FIGS. 15 to 17 represent schematic perspective views of different steps of opening of a fixing buckle according to the second embodiment.

DETAILED DESCRIPTION

Figure 1:
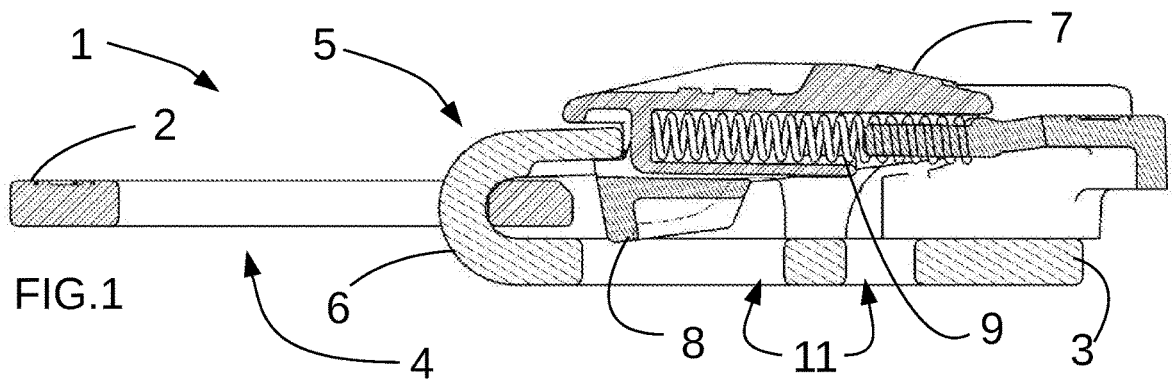
FIGS. 1 to 4 represent schematic cross-sectional views of different steps of opening of a fixing buckle according to a first embodiment.

The fixing buckle 1 comprises a first securing part 2 and a second securing part 3. The first securing part 2 and the second securing part 3 are mounted in removable manner and are configured to enable installation and removal of the first securing part 2 on or from the second securing part 3 or vice versa. The first securing part 2 and second securing part 3 both have a front surface comprising actuating areas of the buckle and an opposite rear surface. The rear surface is advantageously directed towards the user's body.

The first securing part 2 comprises a first coupling element 4. The second securing part 3 comprises a second coupling element 5. The first coupling element 4 collaborates with the second coupling element 5 to perform fixing of the first securing part 2 with the second securing part 3. The first coupling element 4 can be a hole, a recess or a salient part.

In the illustrated embodiment, the first coupling element 4 is a through hole defining a ring. However, the hole can be blind or it is further possible to provide for the first coupling element 4 not to be in the form of a closed ring. For example, it is possible to envisage that the first coupling element 4 be in the form of an arrow or have another shape with salient parts.

The second coupling element 5 comprises one or more hooks 6 which latch onto the first coupling element 4, here the through hole. The hook or hooks 6 are adapted to match the shape of the first coupling element 4.

To fix the first securing part 2 with the second securing part 3, the first coupling element 4 is installed in the hook 6. The hook 6 of the second coupling element 5 is configured to collaborate with the first coupling element 4 so that the first coupling element 4 is fixed to the second coupling element 5 in removable manner.

The hook 6 defines an insertion and extraction channel of the first coupling element 4.

To prevent the first securing part 2 from being involuntarily detached from the second securing part 3, the fixing buckle 1 is provided with a closure system which partially or completely obstructs the insertion and extraction channel. The closure system is assembled in such a way as to allow or prevent detachment of the first securing part 2 from the second securing part 3.

The closure system is configured to define a first position preventing extraction of the second coupling element 5 from the first coupling element 4 and a second position enabling insertion or extraction of the first coupling element 4.

The closure system comprises a first closure plate 7 which presents a first position configured to at least partially obstruct the hook 6, i.e. the extraction channel. In its first position, the first closure plate 7 prevents extraction of the second coupling element 5 from the first coupling element 4. The first closure plate 7 has a second position configured to insert and extract the first coupling element 4 in the hook 6.

The closure system also comprises a second closure plate 8 which presents a first position preventing extraction of the second coupling element 5 from the first coupling element 4 by at least partially obstructing the hook 6 and a second insertion and extraction position of the first coupling element 4. The first position of the second closure plate 8 can also be called third position and the second position of the second closure plate 8 can be called fourth position.

The first closure plate 7 is distinct from the second closure plate 8. Actuation of the first closure plate 7 is independent from actuation of the second closure plate 8 so that it is possible to move the first closure plate 7 without moving the second closure plate 8. In this way, safety is improved as an undesired movement of the first closure plate 7 to open the hook 6 does not result in movement of the second closure plate 8 and therefore in opening of the fixing buckle 1. It is not possible to remove the first coupling element 4 without moving the second closure plate 8 and first closure plate 7.

The inventors observed that in the field of rope access where the user regularly comes into contact with external elements and in particular in the field of tree pruning where a large number of branches are involved, it is particularly important to provide specific and different actuations for the two closure plates 7 and 8. The inventors observed that a great improvement of safety is achieved when opening of the buckle requires application of two different and consecutive forces. The two forces are different as they are not directed in the same direction.

It is particularly advantageous to provide for the first closure plate 7 and second closure plate 8 to be arranged consecutively in the insertion and extraction channel. The first coupling element 4 are separated from the first closure plate 7 by the second closure plate 8. Removal of one of the two closure plates therefore does not enable releasing from the hook 6.

The first and second closure plates 7 and 8 are arranged so as to impose the use of two different and consecutive forces on the fixing buckle to open the latter. To achieve such a result, the first position of the first closure plate 7 is configured to prevent movement of the second closure plate 8 from its first position to its second position. So long as the first closure plate 7 is in the first position, the second closure plate 8 cannot move to its second position.

In a particular embodiment, it is possible to mask the second closure plate 8 by means of the first closure plate 7 when the latter is in the first position. It is thus impossible to actuate the second closure plate 8 at least so long as the first closure plate 7 has not left the first position.

As an alternative or as a complement, the first closure plate 7 disables operation of the second closure plate 8 so long as the first closure plate 7 is in the first position. The second closure plate 8 can be accessible, but any action on the latter does not result in movement from the first position to the second position.

This solution is particularly advantageous when the two closure plates 7 and 8 are fitted consecutively in the extraction channel as the second closure plate 8 is removed last which limits the risks of undesired opening. Undesired actuation of the first closure plate 7 combined with a movement of the first coupling element 7 preventing the first closure plate 7 from returning to the first position after it has been manipulated is no longer possible. In this case, there is only the second closure plate 8 to prevent opening of the fixing buckle 1. In case of undesired actuation of the second closure plate 8, the buckle can open.

The fixing buckle is subjected to two different actuations in time and in their components to achieve opening of the fixing buckle. The actuating area of a closure plate is a button or a lever which is accessible from the front or other surface and which causes movement of the part located in the extraction channel.

In the illustrated embodiments, the actuating area is formed directly on the closure plate so that the direction of movement of the closure plate is identical to the direction of movement of the actuating area.

The first force actuating the first closure plate 7 is applied in a different direction from the second force actuating the second closure plate 8 so as to reduce the frequency of undesired openings of the fixing buckle 1.

The first closure plate 7 is movable in a first direction of movement from the first position to the second position. The first closure plate 7 moves as a result of a first force which comprises a component in the first direction of movement.

The second closure plate 8 is configured so that this component in the first direction of movement is unable to move the second closure plate 8. It is then necessary to apply a second force that is different and adapted to the direction of movement of the second closure plate 8 to obtain opening of the fixing buckle 1.

What is meant by first and second directions of movement of the first and second closure plates 7 and 8 are first and second directions of movement of the actuating area of the first closure plate 7 and of the actuating area of the second closure plate 8.

Figure 2:
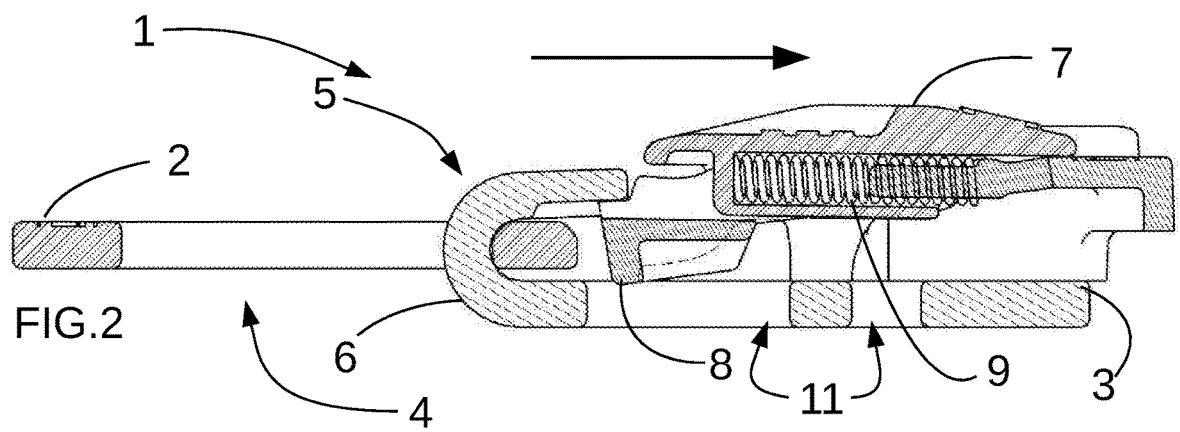
Figure 3:
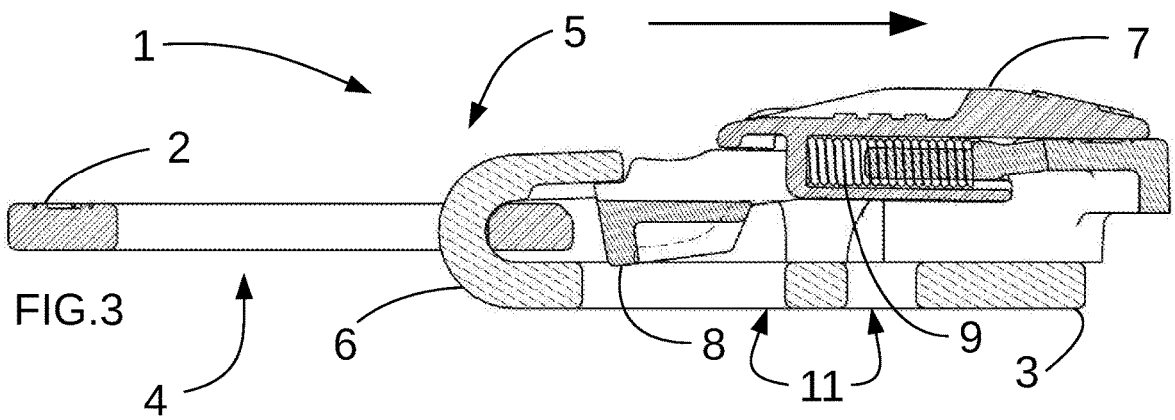
Figure 4:
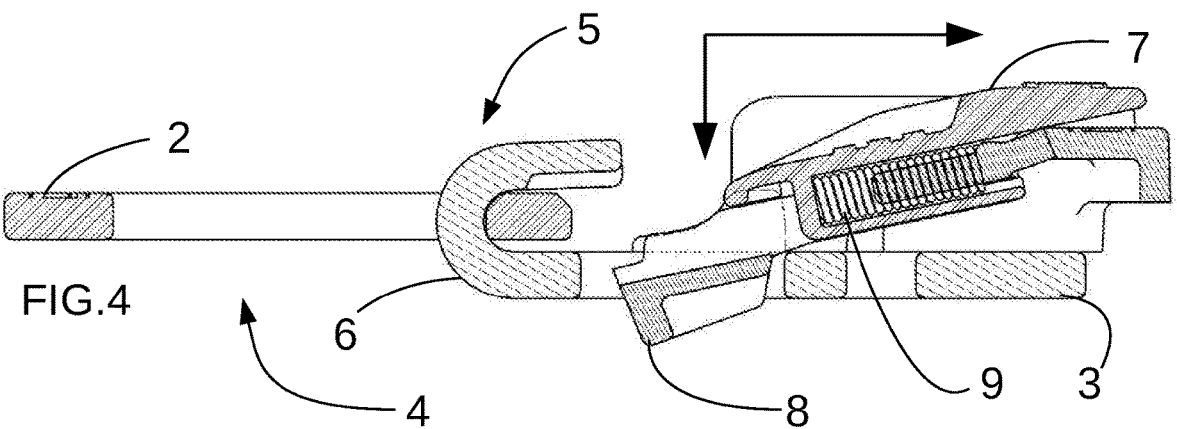
Figure 5:
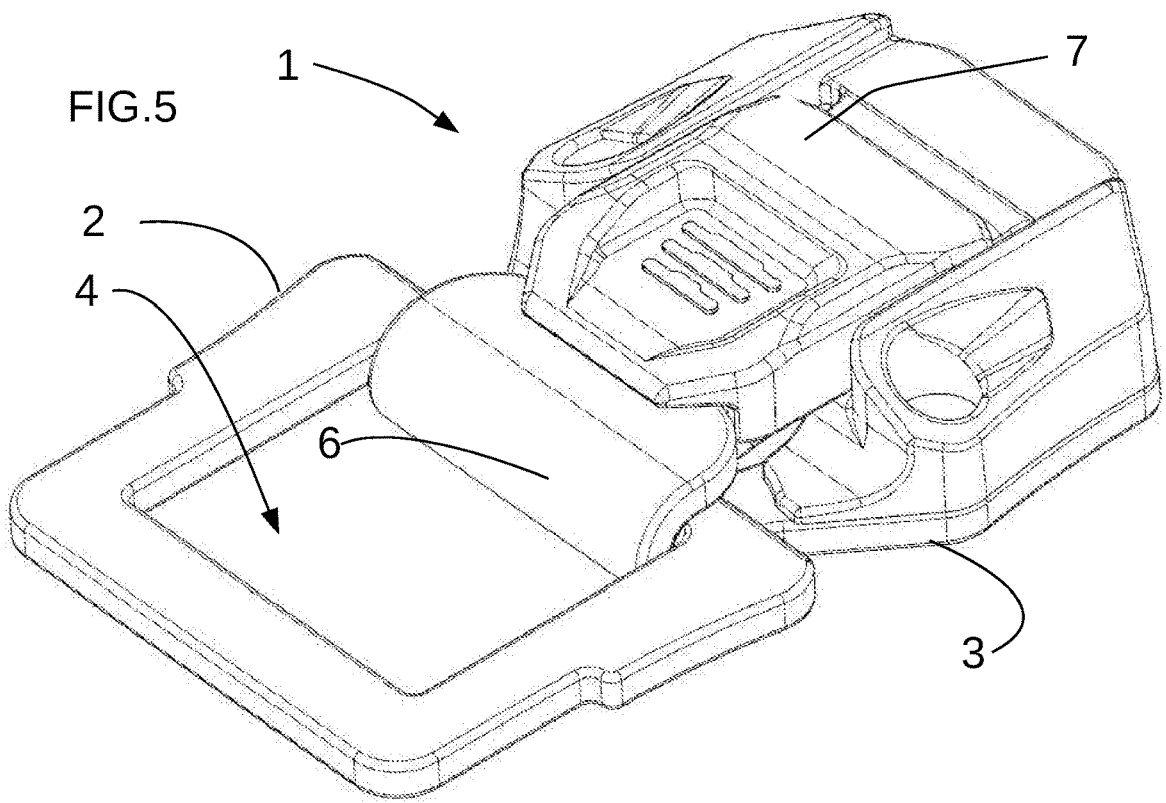
FIGS. 5 to 8 represent schematic perspective views of different steps of opening of a fixing buckle according to the first embodiment.
Figure 6:
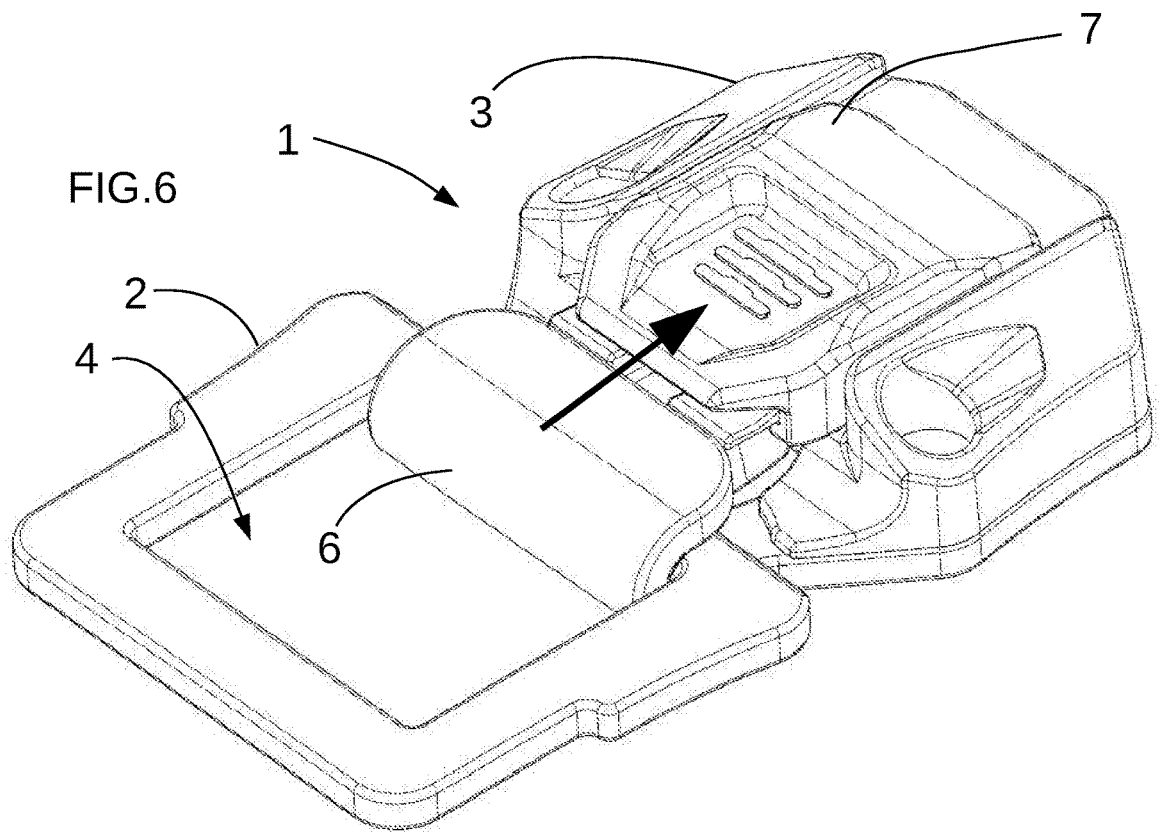
Figure 7:
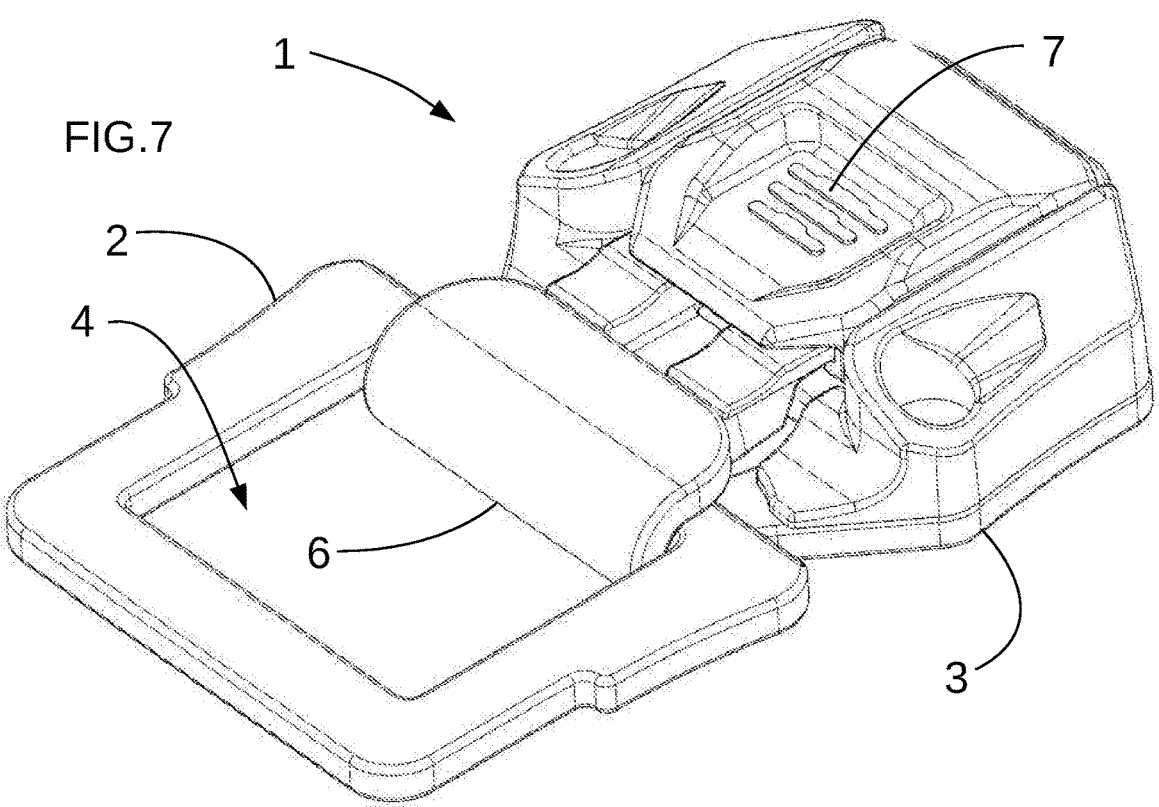
Figure 8:
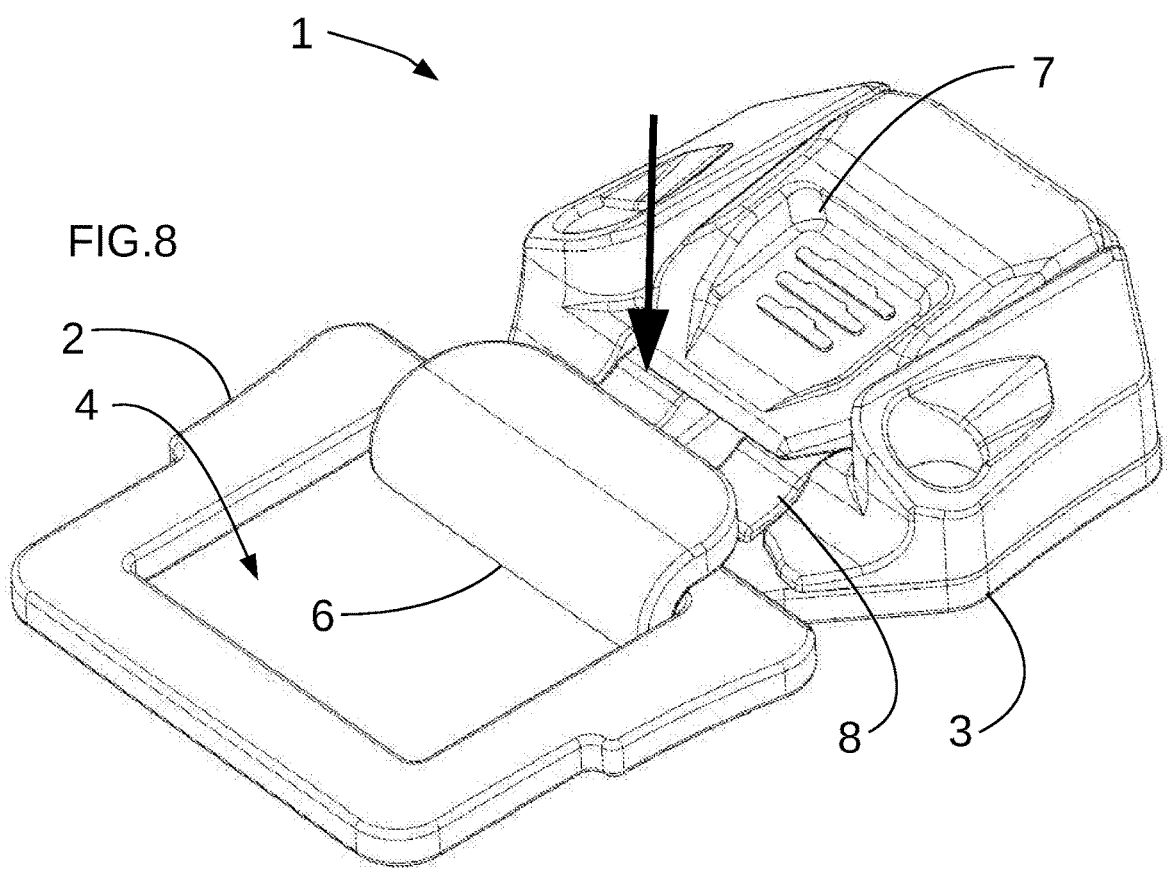

In the embodiment illustrated in FIGS. 1 to 8, the first closure plate 7 is mounted movable in translation and the first direction of movement corresponds to the translation which moves the button of the first closure plate 7 from the first position to the second position. The first closure plate 7 moves away from the hook 6 as illustrated in FIGS. 1, 2 and 3.

By applying a sufficient force on the first closure plate 7 in the first direction of movement, it is possible to move the first closure plate 7. The first direction of movement can correspond to the path followed by a user's finger to move the first closure plate 7 which facilitates use of the fixing buckle.

In the embodiment illustrated in FIGS. 9 to 17, the first closure plate 7 is mounted movable in rotation. Although the movement of the lever of the first closure plate 7 is a rotational movement, this rotation can be obtained by applying a force which comprises a component in a direction of movement and which substantially represents a translation. The first direction of movement can correspond to a translation which moves the button of the first closure plate 7 from the first position to the second position. FIGS. 9 to 13 show a rotation of the first closure plate through an angle of about 180°. Although the force to be applied to obtain movement of the first closure plate is more complex than in the previous embodiment, it is possible to observe a translational movement which moves the first closure plate away from the hook, here to the right.

The displacement movement of the first closure plate 7 is advantageously a single movement such as a translation or a rotation to move from the first position to the second position as this enables the user to easily deactivate the first closure plate 7 even when he is wearing gloves and/or with one finger.

The second closure plate 8 is also movable from the first position configured to at least partially obstruct the hook 6 to the second position in which the hook 6 is released. Movement from the first position to the second position takes place in a second direction of movement. The second direction of movement is different from the first direction of movement. It is thereby more difficult to disengage the first closure plate 7 and second closure plate 8 by means of a single movement, for example due to a branch catching on the first closure plate 7.

In particularly advantageous manner, the second direction of movement forms an angle at least equal to 45° with the first direction of movement. In other words, if a first force is applied on the first closure plate 7 in the first direction, this first force does not result in disengagement of the second closure plate 8. In advantageous manner, the angle between the two directions is at least equal to 90° and preferably at least equal to 120° so that the direction taken to move the first closure plate 7 corresponds to the opposite direction to that which the second closure plate has to take to perform its movement. In conventional manner, if the fixing buckle 1 is subjected to a first movement which results in a first removal force of the first closure plate 7, a reverse movement naturally results in the first closure plate 7 returning to its first position and not by a removal of the second closure plate 8.

To reach the second position of the fixing buckle 1, it is necessary to have a second force which is applied on the second closure plate 8 in the second direction.

Consequently, to reach the second position of the fixing buckle 1, it is necessary to consecutively move the first closure plate 7 from the first position to the second position and then move the second closure plate 8 from the first position to the second position.

In a particularly advantageous embodiment, the first closure plate 7 is associated with a bias spring 9 which is configured to bias the first closure plate 7 to the first position. In this way, if the force used to move the first closure plate 7 to the second position disappears before a second force is applied in the second direction, the first closure plate 7 returns to the first position to disable actuation of the second closure plate 8.

Successive application of two forces in different directions is therefore required to obtain opening of the fixing buckle 1. It is also necessary for the two forces to be applied at the same time at least to initiate the change of position of the second closure plate 8 and to prevent the first closure plate 7 from returning to its first position.

In one embodiment, it is possible to provide for the second closure plate 8 to also be associated with another bias spring so as to move the second closure plate 8 to the first position. In the embodiment illustrated in FIGS. 1 to 4, the bias spring can be formed by the hinge which is flexibly deformed.

In another embodiment, the first closure plate 7 is configured to engage return of the second closure plate 8 to the first position when the first closure plate 7 returns to the first position. In this way, the bias spring of the first closure plate 7 is also operational for the second closure plate 8.

Opening of the fixing buckle 1 can then be achieved by applying a first force in a first direction in order to move the first closure plate 7 from the first position to the second position. Once the second position has been reached, a second force is applied. This second force is applied on the second closure plate 8 in order to open the fixing buckle 1.

In the different embodiments illustrated, movement of the first closure plate 7 from the first position to the second position takes place by moving the actuating area of the first closure plate 7 away from the hook 6.

In the embodiment illustrated in FIGS. 1 to 8, the first closure plate 7 is provided with a button that is movable in translation. In the embodiment illustrated in FIGS. 9 to 17, the first closure plate 7 is provided with a lever that is movable in rotation.

The second closure plate 8 can be movable in translation or in rotation. In the different embodiments illustrated, the second closure plate 8 is movable in rotation as this embodiment is easier to use for the user who is already applying a first force to deactivate the first closure plate 7.

Furthermore, it is particular advantageous to provide for the second force designed to deactivate the second closure plate 8 to be a force directed towards the inside of the fixing buckle 1, i.e. a force directed from the front surface to the rear surface. In this way, the fixing buckle 1 can be opened easily as the fixing buckle 1 generally comes into contact with the user's body.

In a particular embodiment, the first closure plate 7 is configured to prevent the second closure plate 8 from being in the second position when the first closure plate 7 is in the first position. This configuration prevents the second closure plate 8 from remaining in the second position when the first closure plate 7 is in the first position.

In an advantageous configuration illustrated in FIGS. 1 to 8, the first closure plate 7 presses on the hook 6 in the first position. This pressing prevents a force pressing on the first closure plate 7 from resulting in removal of the second closure plate 8 whereas the first closure plate 7 is still in the first position.

It is also possible to provide for the first closure plate 7 or a part of the first closure plate 7 to be used for actuation of the second closure plate 8. In preferential manner, once the first closure plate 7 has left the first position, it is possible to use it to actuate the second closure plate 8 to its second position. It is then possible to use the same actuating surface of the first closure plate 7 to apply the first force which moves the first closure plate 7 from the first position to the second position and to then apply the second force to move the second closure plate 8.

To obtain an embodiment that is easy to use, it is advantageous to provide a first closure plate 7 that is movable in translation and a second closure plate 8 that is movable in rotation and to use the first closure plate 7 to press on the second closure plate 8 and move the latter.

As illustrated in FIGS. 1 to 4, it is particularly advantageous to provide for the spring 9 to be mounted movable in rotation in order to preserve operation of the first closure plate 7 in all configurations. For example, the bias spring 9 is fitted on a hinge which is also provided with a bias spring biasing the second closure plate 8 to the first position.

In preferential manner, if the first force is no longer applied and the second force is applied, the first closure plate 7 returns to the first position and partially obstructs the opening for removal of the hook 6 so that extraction of the first coupling element 4 is impossible or extremely complicated.

In the embodiment illustrated in FIGS. 9 to 17, the first closure plate 7 and second closure plate 8 are both mounted movable in rotation. The first closure plate 7 is mounted movable in rotation in a first direction of rotation and the second closure plate 8 is mounted movable in rotation in a second direction of rotation which is opposite to the first direction of rotation.

When the first closure plate 7 is in the first position, it hides the second closure plate 8 in order to impose application of two opposing movements in consecutive manner to open the fixing buckle 1. The first closure plate 7 presses on the hook 6 to better secure the fixing buckle 1 to prevent involuntary opening.

In the illustrated embodiment, the first closure plate 7 and second closure plate 8 share the same axis of rotation, but it is possible to have different axes of rotation.

In advantageous manner, access to the second closure plate 8 is only possible when the first closure plate has pivoted through an angle at least equal to 45°, preferably at least equal to 90%. In this way, it is necessary to have a first force over a sufficiently large distance to obtain access to the second closure plate 8.

In advantageous manner, the first closure plate 7 and second closure plate 8 share the same bias spring so that the pressure applied on the bias spring increases with the movement of the first closure plate 7 and then with the movement of the second closure plate 8. It is therefore increasingly difficult to achieve opening of the fixing buckle 1 as the pressure on the second closure plate 8 incites the first closure plate to return to the first position.

It is also advantageous to provide for the second closure plate 8 to move from the first position to the second position when a force is applied directed towards the inside of the second part. In this case, it is much more difficult to obtain undesired opening of the second closure plate. The first closure plate 7 which forms a cover does in fact have to be raised. Once the first closure plate 7 has been raised, it is necessary to press on the second closure plate 8 to open the fixing buckle 1.

As the directions of rotation of the two closure plates 7 and 8 are opposite from one another, it is difficult to perform unintentional opening of the fixing buckle 1 as it is necessary to apply a first force which tends to raise the lever of the first closure plate 7 towards the front surface of the buckle 1 and to then apply a second force directed towards the rear surface. At the same time, the two forces have to be associated with consecutive movements in opposite directions to perform opening of the buckle 1.

The different embodiments remain easy to use as the same button is used to apply the two movements so that a single finger can be used, the rear surface resting against the user's body. As an alternative, the finger used to move the first closure plate 7 is naturally located between the first closure plate 7 and second closure plate 8 so that a change in the force applied by the user's finger enables opening of the buckle to be achieved.

In a particular embodiment, it is advantageous to have a fixed axis of rotation with respect to the body of the second securing part 3 to prevent pressing on the two actuators 7 and 8 from making the second actuator 8 move from the first position to the second position. The hook 6 remains obstructed by means of the first closure plate 7.

In an embodiment illustrated in FIGS. 9 to 17, the first closure plate 7 is mounted movable with respect to the second closure plate 8. The first closure plate 7 presses on the second closure plate 8. In the illustrated embodiment, the axis of rotation of the first closure plate 7 is fixed to the second closure plate 8 and the axis of rotation can move when movement of the second closure plate 8 takes place. The second closure plate 8 presents a movement other than a rotation with respect to the axis of rotation of the first closure plate 7.

In the illustrated example, the second closure plate 8 is movable in flexion or in rotation along another axis of rotation. In the illustrated case, one end of the second closure plate 8 is preferentially fixed to the body of the second securing part 3. However it is also possible to provide another movement such as a translation for example.

The first closure plate 7 is configured to prevent actuation of the second closure plate 8 from its first position to its second position when the first closure plate 7 is in its first position. The first closure plate 7 has a blocking part which is mounted movable with respect to the second closure plate 8 and with respect to the body of the second part 3.

When the first closure plate 7 is in its first position, the blocking part presses on the body of the second part 3 to prevent movement of the second closure plate 8 from the first position to the second position.

When the first closure plate 7 is in its second position, the blocking part does not prevent movement from the first position to the second position.

Figure 9:
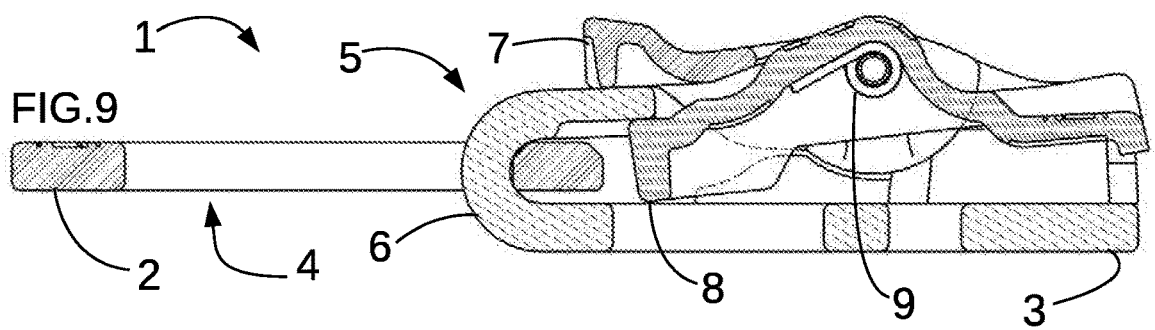
Figure 10:
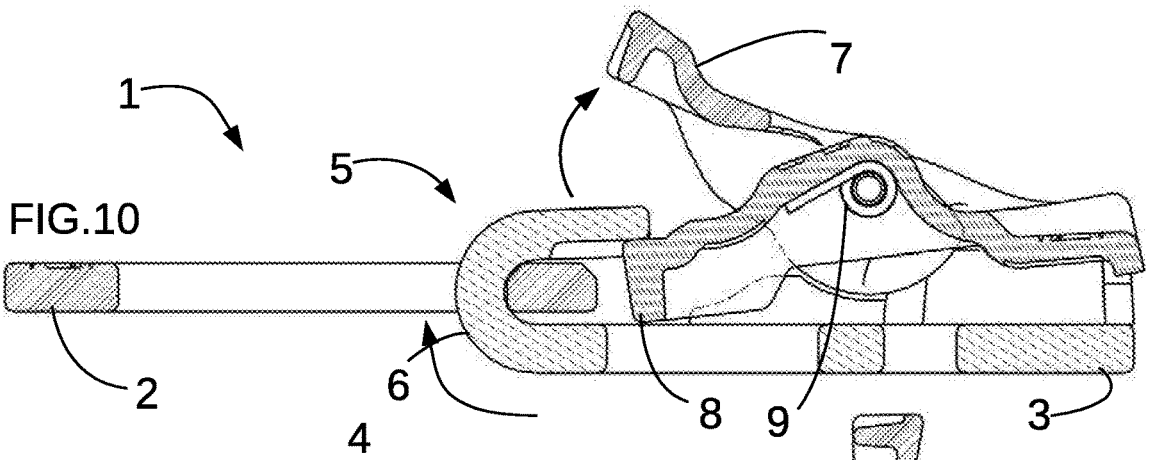
Figure 11:
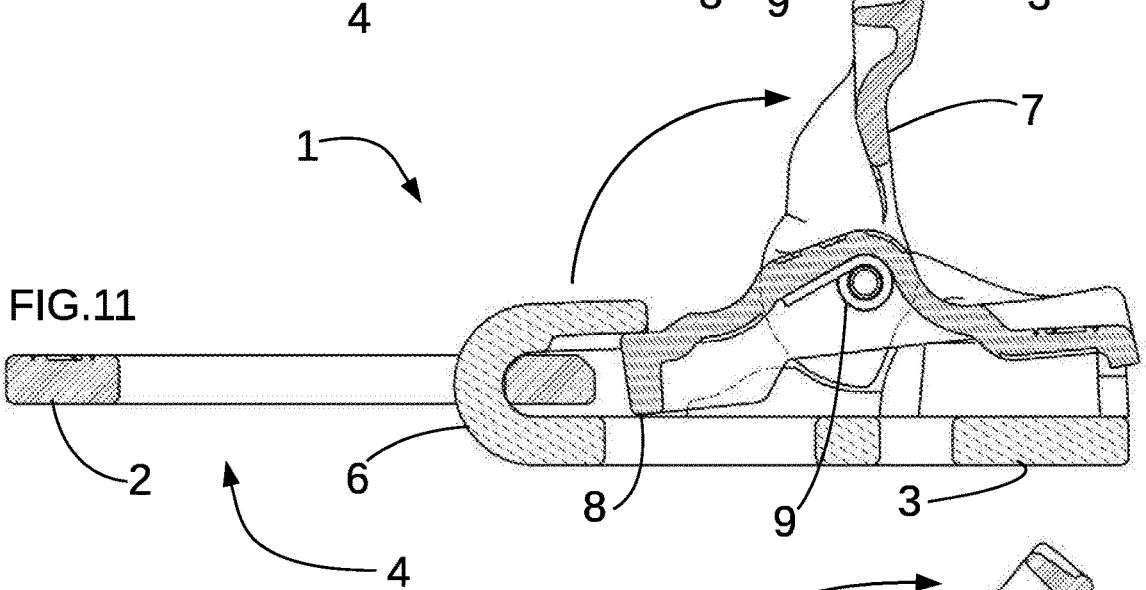
Figure 12:
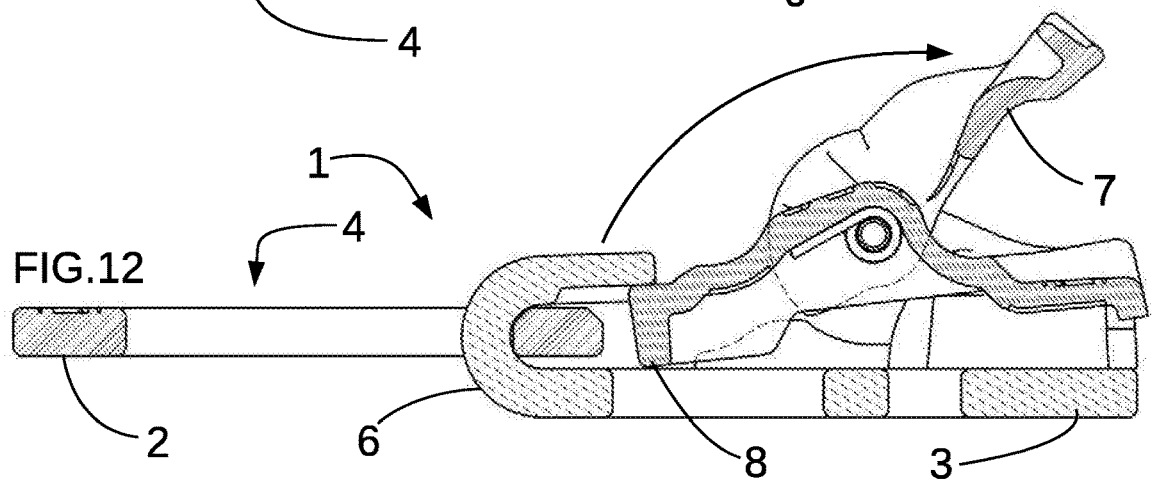
Figure 16:
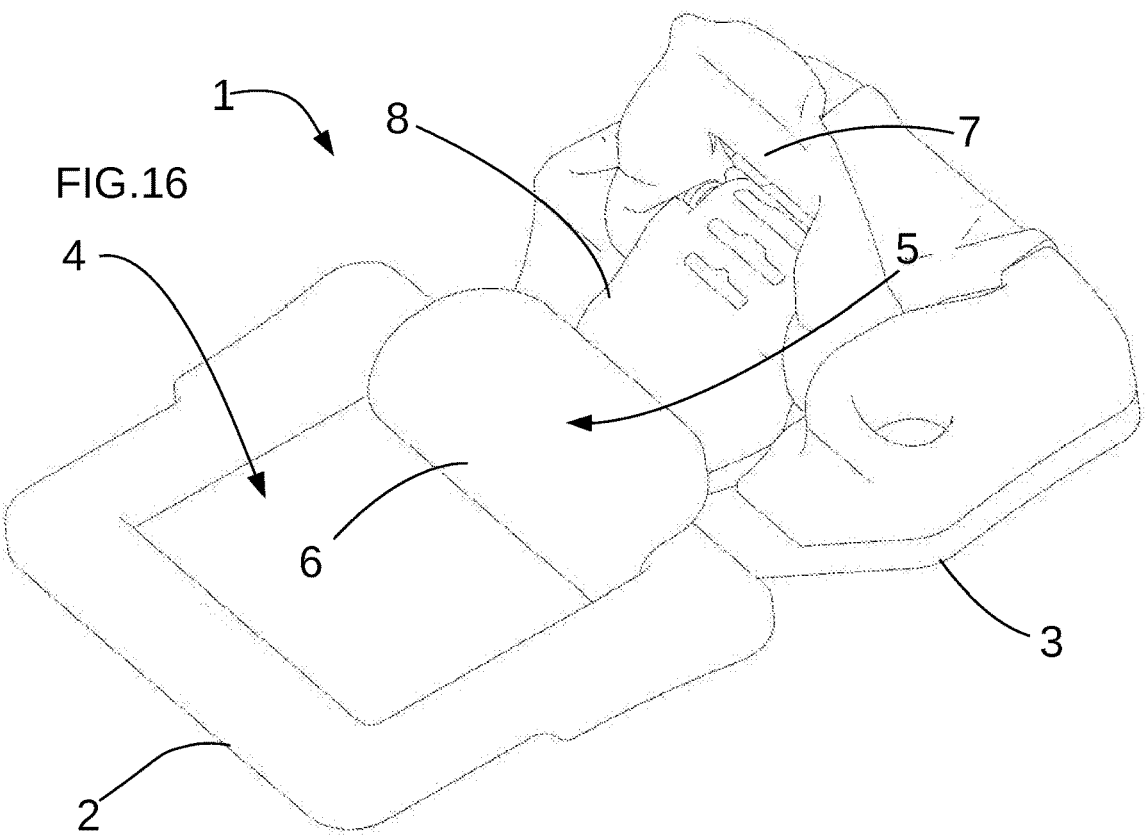
Figure 17:
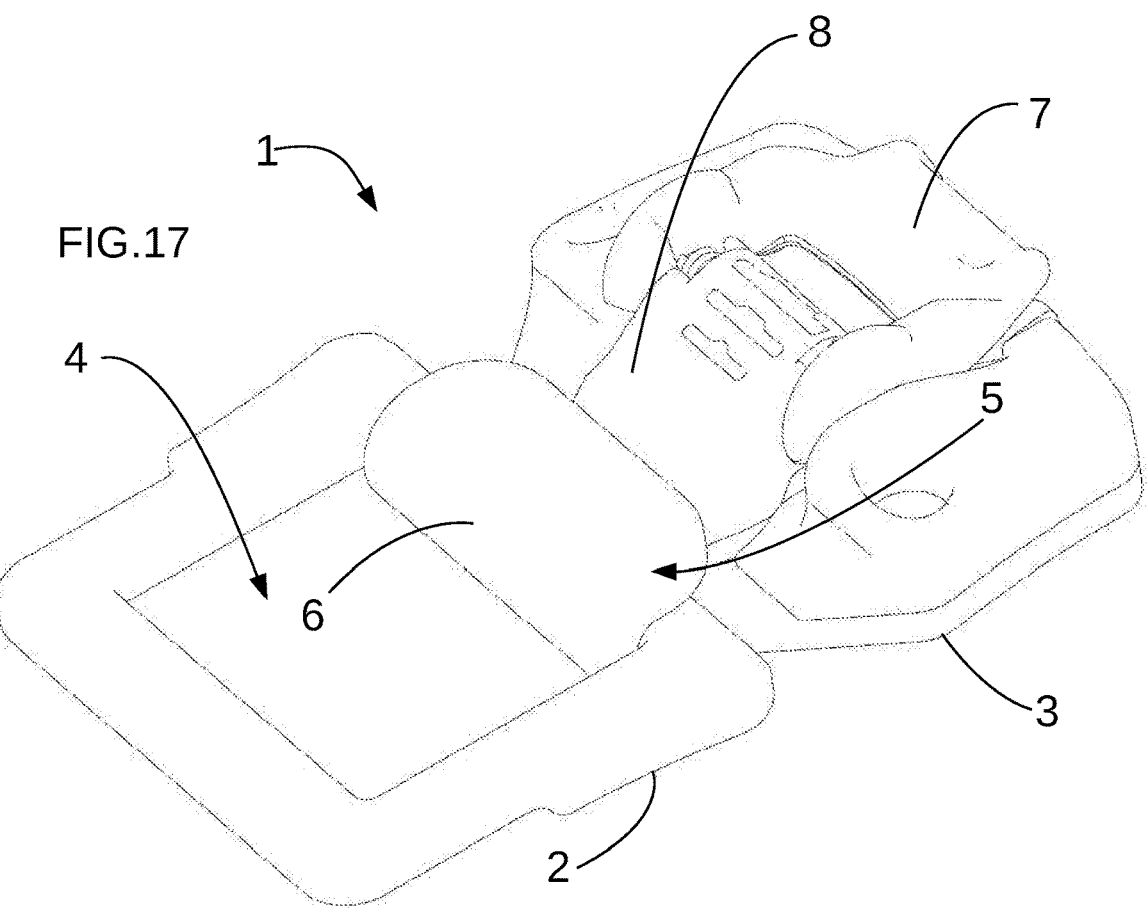

In the particular embodiment illustrated in FIGS. 9 to 12, the blocking part is mounted rotating and collaborates with the body of the second part 3. In FIGS. 9, 10 and 11, the first closure plate 7 moves from the first position to the second position. During this movement, the blocking part moves and blocks movement of the second closure plate 8 until a threshold movement is reached.

Beyond a certain movement, here a threshold angle value, the blocking part no longer comes into contact with the body of the second part 3 when the second closure plate 8 is actuated. It is then possible to move the second closure plate 8 from its first position to its second position to obtain opening of the hook 6.

It is possible to adjust the shape and/or size of the blocking part to define the value of the threshold angle above which the blocking part retracts.

For example, it is advantageous to provide for the blocking part to no longer prevent actuation of the second closure plate 8 after a movement of the first closure plate 7 beyond an angle at least equal to 30°, preferably at least equal to 90° and even more advantageously at least equal to 120°.

In the illustrated example, if the force applied on the first closure plate 7 to reach the second position ceases, the first closure plate returns to its first position. The blocking part presses on the body and moves the second closure plate 8 back to its first position.

The blocking part can also be used in the first embodiment.

The use of a hook 6 also plays a part in safety by limiting the insertion/extraction channel. Once the channel is open, it is necessary to move the first coupling element 4 to remove it from the hook 6.

In order to enhance safety, it is particularly advantageous to provide for the actuating button of the first closure plate 7 to be located above the second closure plate 8 in the extraction channel so that pressing on a rigid part able to actuate the first closure plate 7 partially obstructs the extraction channel of the first coupling element 4.

In the same way, it is particularly advantageous to provide for the actuating lever of the rotary second closure plate 8 to be located between the rotation pivot and the hook 6 so that the external element which involuntarily actuates the closure plate 8 forms an obstruction for extraction of the first coupling element 4.

As illustrated in the different embodiments, it is particularly advantageous to provide for the first closure plate 7 to press on the hook 6 and to also press against the body of the second securing part by means of the rotation axis of the second closure plate 8.

In advantageous manner, the second closure plate 8 is located inside the hook 6, i.e. between the front surface and the rear surface of the second securing part 3, and it is configured to move towards the rear surface when performing its movement to the second position. Advantageously, the second closure plate 8 comes into contact with the inner surface of the hook 6 to prevent movement of the first coupling element 4.

Figure 18:
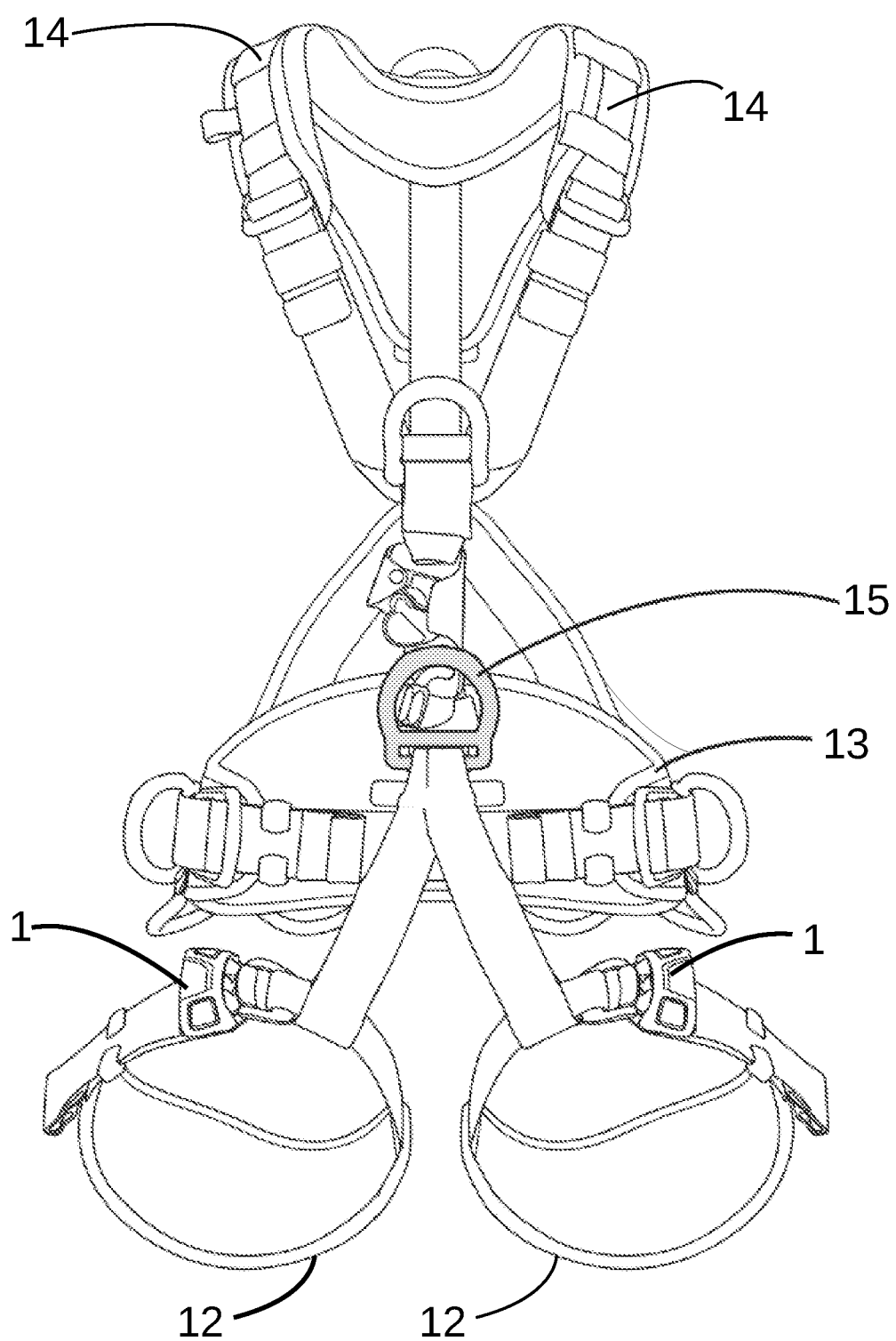
FIG. 18 represents, in schematic manner, a harness provided with fixing buckles according to the invention.

As illustrated in FIG. 18, the fixing buckle 1 can be fitted on a harness. In advantageous manner, the fixing buckle 1 is fitted to close a pair of thigh loops 12. As an alternative or as a complement, the fixing buckle can be used to close the belt 13 of the harness. It is also possible to provide for the fixing buckle 1 to be fitted so as to fix shoulder straps 14. In the harness illustrated, the shoulder straps 14 are fitted removable with respect to the belt 13. The harness comprises a first connector 15 fixed to the belt 13 and to the thigh loops 12. Other connectors fixed to the shoulder straps can also be used.

The first securing part 2 comprises at least a first means for attachment to a first strap. The first part 2 can be a ring with one end which forms the first coupling element 4 and the other end which forms the means for attachment to the first strap.

The second part 3 comprises a second means for attachment to a second strap. The second means for attachment can be formed by one or more slots 11.

The method for opening the fixing buckle 1 comprises provision of a first securing part 2 provided with a first coupling element 4 and a second securing part 3 provided with a second coupling element 5 defining a hook 6. The hook 6 is configured to collaborate with the first coupling element 4 so that the first coupling element 4 is fixed to the second coupling element 5 in removable manner. The hook 6 is obstructed by the first closure plate 7 and second closure plate 8.

To open the fixing buckle, the first closure plate 7 simply has to be moved from a first position preventing extraction of the first coupling element 4 from the second coupling element 5 to a second position allowing insertion and extraction of the first coupling element 4.

The first position of the first closure plate 7 prevents movement of the second closure plate from the first position preventing extraction of the second coupling element from the first position to the second position allowing insertion and extraction of the first coupling element.

The second closure plate 8 then has to be moved from the first position preventing extraction of the first coupling element from the second coupling element to the second position allowing insertion and extraction of the first coupling element 4. Once the buckle has been opened, it is possible to remove the first coupling element from the hook 6.

The invention claimed is:

1. A fastening buckle comprising:
    a first securing part provided with a first coupling element,
    a second securing part provided with a second coupling element defining a hook, the hook being configured to collaborate with the first coupling element so that the first coupling element is attached to the second coupling element in removable manner, and
    a closure system defining a first position preventing extraction of the first coupling element from the second coupling element and a second position allowing extraction of the first coupling element from the second coupling element, the closure system comprising:
        a first closure plate presenting a first position configured to at least partially obstruct the hook and prevent extraction of the first coupling element from the second coupling element, and a second position configured to allow extraction of the first coupling element from the second coupling element, and
        a second closure plate presenting a first position preventing extraction of the first coupling element from the second coupling element by at least partially obstructing the hook, and a second position configured to allow extraction of the first coupling element from the second coupling element,
    wherein
        the first position of the first closure plate is configured to prevent movement of the second closure plate from the first position to the second position,
        the second closure plate separates the first coupling element and the first closure plate along an extraction channel defined by the hook, and
        the second closure plate is configured such that the second closure plate moves from the first position to the second position by first moving away from a free end of the hook and then second moving into a hole formed in a body of the second securing part.

2. The fastening buckle according to claim 1, wherein, when the first closure plate is in the first position, the first closure plate at least partially masks the second closure plate so as to prevent the second closure plate from moving from the first position to the second position.

3. The fastening buckle according to claim 1, wherein movement of the first closure plate from the first position to the second position takes place in a first direction of movement and movement of the second closure plate from the first position to the second position takes place in a second direction different from the first direction.

4. The fastening buckle according to claim 3, wherein the first direction and the second direction define an angle at least equal to 45°.

5. The fastening buckle according to claim 4, wherein the angle is at least equal to 90°, or at least equal to 120°.

6. The fastening buckle according to claim 1, wherein the first closure plate and second closure plate are mounted movable in rotation and wherein rotation of the first closure plate from the first position to the second position takes place in a first direction and rotation of the second closure plate from the first position to the second position takes place in a second direction opposite to the first direction.

7. The fastening buckle according to claim 1, wherein the first closure plate is mounted movable in translation from the first position to the second position and movable in rotation to actuate the second closure plate from the first position to the second position, the first closure plate being in the second position.

8. The fastening buckle according to claim 1, wherein the first closure plate presses on the hook in the first position.

9. The fastening buckle according to claim 8, wherein the first closure plate is configured to form a protective cover which masks the second closure plate to prevent actuation of the second closure plate from the first position to the second position.

10. The fastening buckle according to claim 1, wherein the first closure plate is configured to prevent actuation of the second closure plate when the first closure plate is in the first position.

11. The fastening buckle according to claim 1, wherein:
    the first closure plate is mounted movable with respect to a support point fixed to the second closure plate,
    the first closure plate comprises a blocking part, and
    the first closure plate is configured so that, when the first closure plate is in the first position, the blocking part prevents movement of the second closure plate from the first position to the second position and that when the first closure plate is in the second position, the blocking part enables movement of the second closure plate from the first position to the second position.

12. The fastening buckle according to claim 11, wherein the first closure plate is mounted rotationally with respect to the second closure plate and wherein the blocking part is mounted rotationally with respect to the second closure plate.

13. A harness comprising the fastening buckle according to claim 1, wherein the first securing part is provided with a first attachment attached to a first strap and the second securing part is provided with a second attachment attached to a second strap.

14. A method for opening a fastening buckle comprising:
    providing a first securing part provided with a first coupling element and a second securing part provided with a second coupling element defining a hook, the hook being configured to collaborate with the first coupling element so that the first coupling element is fixed to the second coupling element in removable manner, the hook being obstructed by a first closure plate and a second closure plate, moving the first closure plate from a first position preventing extraction of the first coupling element from the second coupling element up to a second position enabling extraction of the first coupling element from the second coupling element, the first position of the first closure plate preventing movement of the second closure plate from the first position to the second position, and moving the second closure plate from the first position preventing extraction of the first coupling element from the second coupling element up to the second position enabling insertion and extraction of the first coupling element, wherein the second closure plate is configured such that the second closure plate moves from the first position to the second position by first moving away from a free end of the hook and then second moving into a hole formed in a body of the second securing part.

15. The fastening buckle according to claim 1, wherein:

the second securing part is provided with a front side and a rear side opposite the front side, the hook has the free end at the front side of the second securing part, the rear side of the second securing part includes a flat rear surface that is configured to face a user's body, and the second closure plate is configured such that, when the second closure plate moves from the first position to the second position, the second closure plate partially extends further rearward than the flat rear surface of the second securing part.

16. A fastening buckle comprising:

a first securing part provided with a first coupling element, a second securing part provided with a second coupling element defining a hook, the hook being configured to collaborate with the first coupling element so that the first coupling element is attached to the second coupling element in removable manner, and a closure system defining a first position preventing extraction of the first coupling element from the second coupling element and a second position allowing extraction of the first coupling element from the second coupling element, the closure system comprising:

a first closure plate presenting a first position configured to at least partially obstruct the hook and prevent extraction of the first coupling element from the second coupling element, and a second position configured to allow extraction of the first coupling element from the second coupling element, and a second closure plate presenting a first position preventing extraction of the first coupling element from the second coupling element by at least partially obstructing the hook, and a second position configured to allow extraction of the first coupling element from the second coupling element, wherein the first position of the first closure plate is configured to prevent movement of the second closure plate from the first position to the second position, the second closure plate separates the first coupling element and the first closure plate along an extraction channel defined by the hook, the second securing part is provided with a front side and a rear side opposite the front side, the hook has a free end at the front side of the second securing part, the rear side of the second securing part includes a flat rear surface that is configured to face a user's body, and the second closure plate is configured such that, when the second closure plate moves from the first position to the second position, the second closure plate partially extends further rearward than the flat rear surface of the second securing part.

* * * * *